March 13, 1962 J. B. PINTO 3,024,957

TAPE APPARATUS

Filed Jan. 5, 1959

3 Sheets-Sheet 1

INVENTOR.
JULIAN B. PINTO
BY
Christie, Parker & Hale
ATTORNEYS

INVENTOR.
JULIAN B. PINTO
BY Christie, Parker & Hale
ATTORNEYS

March 13, 1962 J. B. PINTO 3,024,957

TAPE APPARATUS

Filed Jan. 5, 1959 3 Sheets-Sheet 3

INVENTOR.
JULIAN B. PINTO
BY
Christie, Parker & Hale
ATTORNEYS

United States Patent Office 3,024,957
Patented Mar. 13, 1962

3,024,957
TAPE APPARATUS

Julian B. Pinto, West Covina, Calif., assignor, by mesne assignments, to Consolidated Electrodynamics Corporation, Pasadena, Calif., a corporation of California Filed Jan. 5, 1959, Ser. No. 784,962
10 Claims. (Cl. 226—49)

This invention relates to tape apparatus and more particularly to tape transport apparatus for converting or adapting tape apparatus utilizing tape reels for transporting the tape by reel-to-reel operation to a continuous loop tape operation and vice versa.

Data processing apparatus presently employed utilizes storage media such as paper, film and magnetic tapes to record information thereon in terms of coded marks, signals or the like. In magnetic tape apparatus in particular, the information may be recorded at high densities, therefore requiring that the recording and reproducing transducers be accurately and precisely aligned with respect to the magnetic tape storage medium passed thereby. In addition, when tape storage apparatus is arranged for reel-to-reel operation, that is, a storage reel is provided from which the tape is unwound and is wound up on a take-up reel, the reels must be accurately located and positioned so as not to introduce any errors into the transducing operation. This is generally accomplished by accurately aligning and positioning the reel hubs.

There is presently commercially available tape apparatus operating solely as reel-to-reel apparatus or solely as continuous loop apparatus, each type of apparatus having its particular field of use. When accurate, detailed and repetitive recorded information is required, such as in the study of transients and rocket engine tests, wave analysis by means of time compression, well drilling investigations, etc., the value of the continuous loop apparatus is virtually without parallel. In some applications and types of work there is a need for both types of tape apparatus. However, unless the user has call for both types to such an extent to make it economically feasible for him to have the two pieces of tape equipment, he generally will purchase only the one type of equipment for which he has the most use. It is therefore seen that a commercial need is present for providing an adapter for existing and future tape apparatus that will allow changes in tape transports from either reel-to-reel or loop operation to the other type to thereby afford the advantages of both types of operation in the one piece of equipment.

Any adapter or converter for changing the type of tape transport operation should provide this change with as little expense as possible and without resorting to special tape transports especially adapted for the desired transporting operation. Furthermore, the tape adapter should be such that both present and future owners of tape apparatus can gain the advantages of the two distinctly different instruments for very little more than the expense of one instrument.

This invention provides an inexpensive, easily manufactured, adapter or converter for changing tape transport apparatus from reel-to-reel operation to a continuous loop operation and back to reel-to-reel operation with a minimum of parts and time. The adapter may be quickly and easily attached and detached from a conventional reel-to-reel tape transport base without any major modifications and without disturbing the accurate alignment of the reel hubs required for the reel-to-reel operation and yet utilizing the precision transducer assembly on the tape transport base.

The tape loop adapter comprises a pair of tape guiding members adapted to attach to the front of the tape transport base in place of the standard tape reels. Each of these tape guiding members includes a plurality of tape guiding rollers to receive and guide the tape loop around same. The tape guiding members include an annular portion clamped against the tape transport base by means of a hand nut cooperating with an annular mounting member attached to the tape transport base. The length of the magnetic tape that can be carried or transported by this invention can be made continuously variable by the provision of indexing means or detent positions for the annular mounting member cooperating with a detent member carried by the tape guiding members. The tape guiding members are indexed by this means to a position corresponding to the length of tape loop required to be transported.

These and other features of the present invention may be more fully appreciated when considered in the light of the following specification and drawings, in which.

Figure 1:
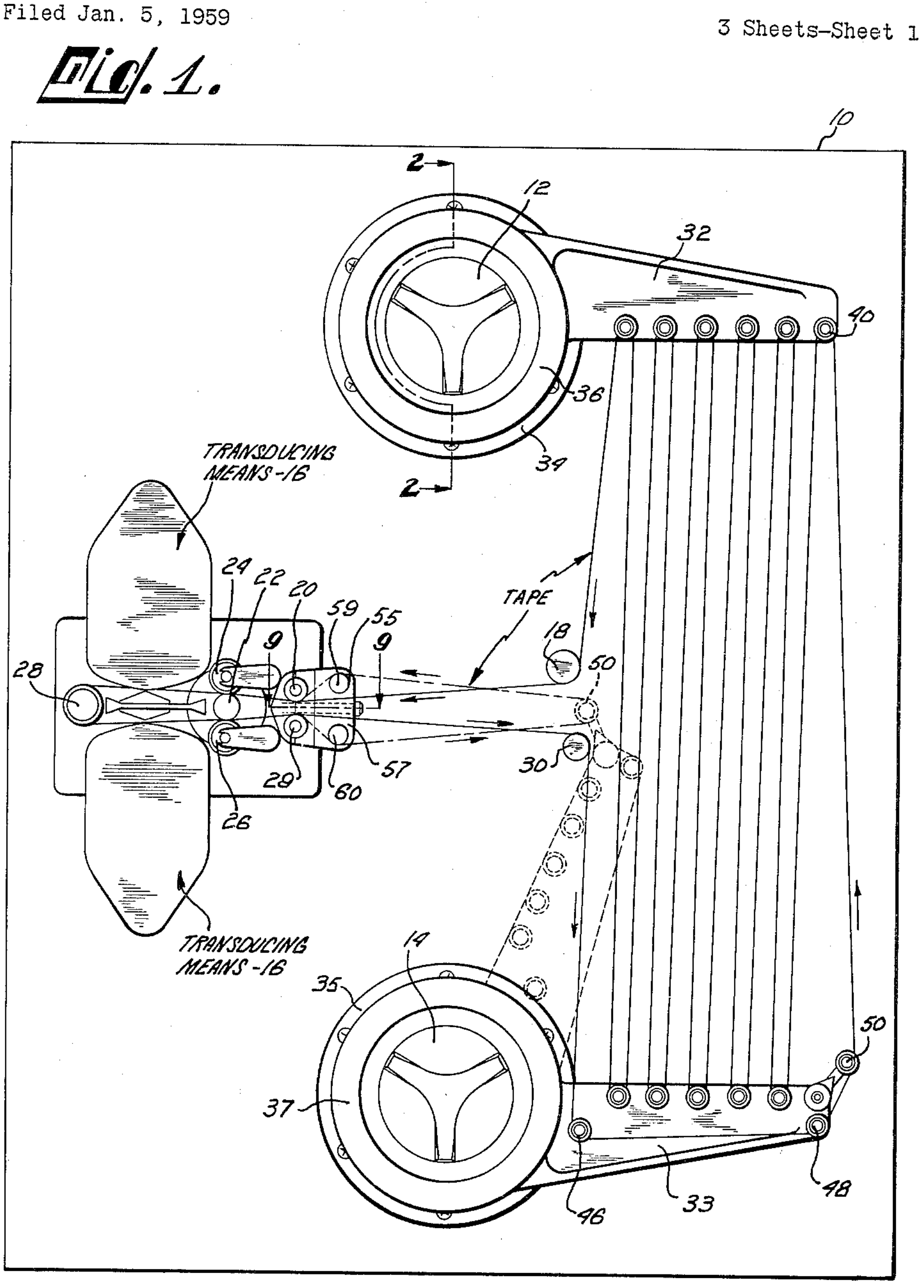
FIG. 1 is a front elevational view of the tape transport base showing the tape loop adapter attached thereto and embodying the invention.
Figure 9:
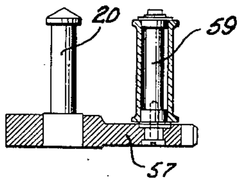
FIG. 9 is a sectional view of the platform of FIG. 1 taken along the line 9—9.

Referring to the drawings, tape apparatus of the type contemplated by this invention will be described, with particular reference to FIG. 1 for the present, wherein magnetic tape apparatus is shown mounted on a tape transport base 10, having a pair of spaced apart reel hubs 12 and 14 extending therethrough. The reel hubs 12 and 14 are spaced with the hub 12 arranged adjacent the top of the tape transport base 10 and the reel hub 14 arranged adjacent the bottom of the base 10, with a pair of transducing means 16 arranged intermediate the hubs 12 and 14. The reel hubs 12 and 14 are defined to normally receive a tape supply reel and a tape take-up reel, respectively. The tape apparatus is shown with these reels detached and with the continuous loop apparatus mounted thereon. When the tape apparatus is operated as reel-to-reel apparatus, the magnetic tape stored on the supply reel for the hub 12 is looped from the supply reel attached to the hub 12 around an idler roller 18. The idler roller 18 is spaced below the reel hub 12 and in position to receive the tape from the supply reel to change the direction of the tape so as to be advanced towards the transducing means 16. The magnetic tape passed around the idler roller 18 is then passed to an entering roller 20 horizontally spaced from the roller 18 in a direction towards the transducing means 16 and which transducing means is in turn arranged adjacent a capstan drive means 22.

The drive means 22 is arranged with a pair of pinch rollers 24 and 26 in engagement therewith to provide the frictional driving engagement for the transported magnetic tape. The magnetic tape driven in this fashion is passed beyond the topmost transducing means 16 to a reversing roller 28 arranged on the opposite side of the transducing means 16 from the capstan 22. The reversing roller 28 is arranged in alignment with the capstan 22 and receives the magnetic tape which is looped around same and reverses its direction back towards the lower transducing means 16 to be advanced through to the combination of the capstan 22 and the pinch roller 26. The magnetic tape driven through the capstan 22 and the pinch roller 26 is then guided to an exit roller 29 spaced opposite the entering roller 20 to guide the magnetic tape towards another idler roller 30. The idler roller 30 receives the magnetic tape from the exit roller 29 and changes its direction towards the tape take-up reel mounted on the hub 14. It will be appreciated that when a transducing operation is called for, the magnetic tape is passed from the supply reel to the take-up reel past each of the transducing means 16. At all times that the associated drive equipment is turned on, the capstan is rotated at a predetermined speed to effect the desired tape driving action.

With this conventional reel-to-reel structure and operation in mind, the continuous loop apparatus for adapting the tape handling machine to continuous loop operation will be described. The continuous loop apparatus is adapted to cooperate with the transducing means 16 and the tape guiding means comprising the above described rollers 18, 20, 24, 26, 28, 29, and 30. The continuous loop apparatus includes tape guiding members 32 and 33 clampable to the tape transport base 10 by means of individual annular members 34 and 35 and hand nuts 36 and 37.

Figures 2, 3:
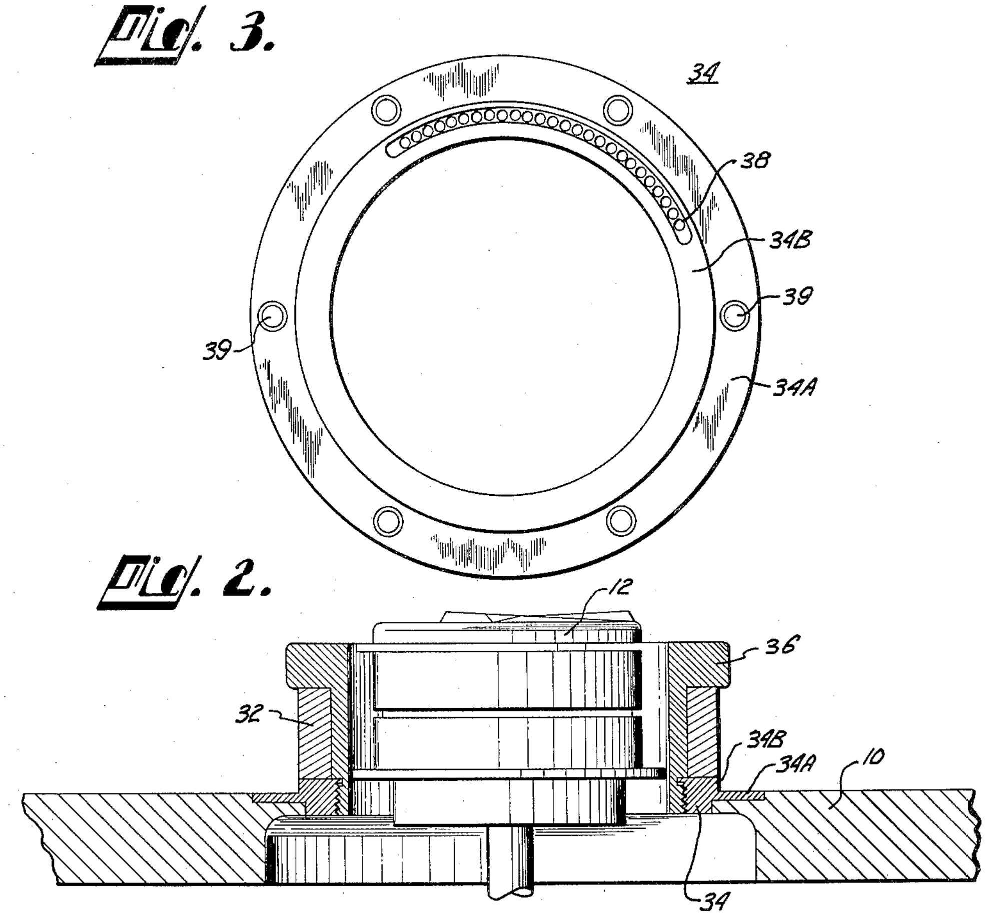
FIG. 2 is a partial sectional and elevational view of the apparatus of FIG. 1 taken along the line 2—2.
FIG. 3 is a front elevational view of the annular mounting member shown in FIG. 1 and illustrating the detent positions.

The annular or ring-like members 34 and 35 are adapted to be secured to the tape transport base 10 adjacent the reel hubs 12 and 14. The members 34 and 35 are defined with a grooved portion similar to the portion 34ª overlying the corresponding portion of the base 10 and adapted to lie flush therewith. Arranged inwardly of the grooved portion 34ª is a land portion 34ᵇ, as best seen in FIG. 2. The land portion 34ᵇ is provided with a plurality of spaced apertures or holes 38 around a portion of the periphery thereof. The apertures 38 are dimensioned to receive a detent member, as will be explained more fully hereinafter. The internal surface of the annular member 34 is threaded to receive the hand nut 36. The members 34 and 35 may be secured to the tape transport base 10 through the provision of the apertures 39 defined to receive a suitable fastener.

It should be noted at this point and it is an important feature of this invention that the annular members 34 and 35 are adapted to be permanently secured to the tape transport base 10 after the initial installation thereof. This permanent installation of the members 34 and 35 does not interfere with the normal reel-to-reel operation of the tape apparatus and facilitates the conversion for continuous loop operation.

Figure 5:
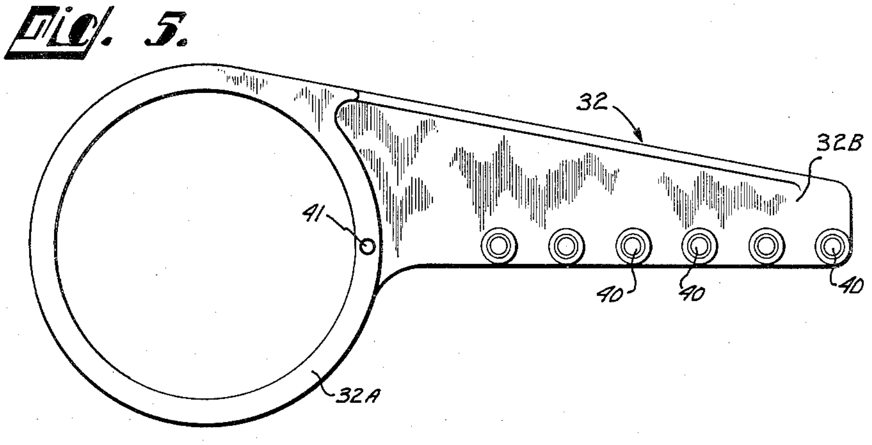
FIG. 5 is a front elevational view of the detached topmost tape guiding member including the attached detent member of FIG. 4.
Figure 6:
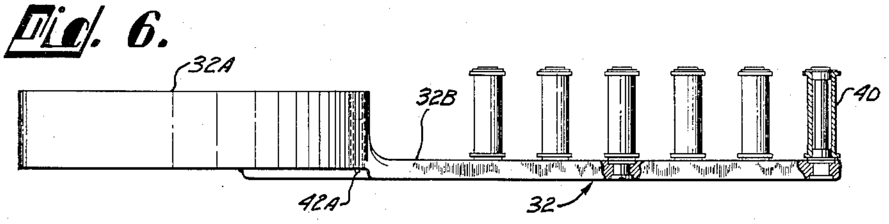
FIG. 6 is a side elevational view, partially in section, of the tape guiding member of FIG. 5.

The tape guiding members 32 and 33 are each similarly constructed except as indicated hereinbelow and the construction for the member 32 will be described with the understanding the member 33 is similarly arranged. The tape guiding member 32 is provided with an annular mounting portion such as the portion 32ª shown in FIG. 5 and an elongated tape guiding portion 32ᵇ extending therefrom. The annular portion 32ª is defined to rest on the land 32ᵇ for the annular member 34. The tape guiding portion 32ᵇ is defined with one end surface extending from the mounting portion 32ª approximately at a tangent thereof to define a tapering edge, as illustrated. The opposite edge of the mounting portion 32ᵇ is defined with a straight face. Adjacent this straight face is mounted a plurality of spaced tape guiding rollers such as the outermost roller 40. The tape guiding rollers 40 are secured and journalled to the portion 32ᵇ to be rotatable thereon. The tape guiding member 32 is also apertured at the annular portion 32ª at a point thereon defined by the intersection of the center line of the tape guiding rollers 40 and the center of the surface of the portion 32ª. This aperture is identified as the aperture 41 and as shown in FIG. 6 is threaded and extends all the way through the mounting portion 32ª. This aperture 41 is threaded to receive an indexing or detent member 42.

Figure 4:
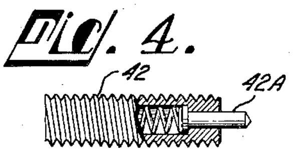
FIG. 4 is a view of the detached detent member.

The detent member 42 is shown in FIG. 4 detached from the tape guiding arm 32. The indexing member 42 is externally threaded so as to be threaded into the aperture 41 and is thereby carried by the tape guiding member 32. The indexing member 42 is provided with a plunger 42ª at one end which is internally spring biased. The plunger 42ª is defined to be received into the apertures 38 provided for the annular member 34.

Figure 7:
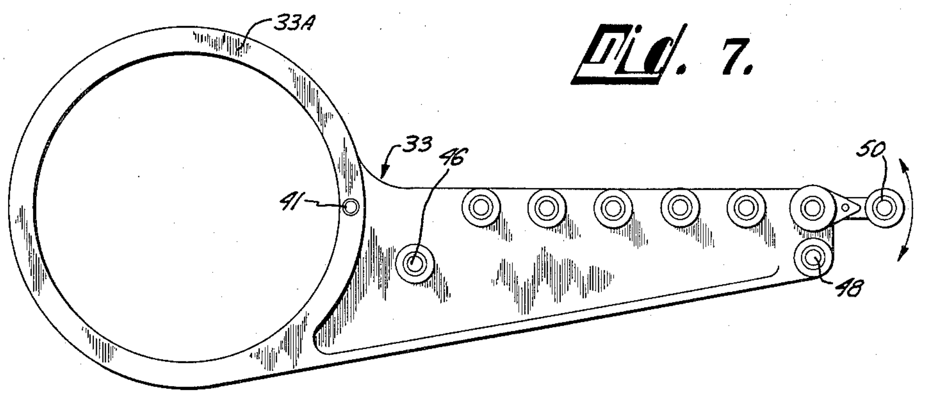
FIG. 7 is a front elevational view of the detached lowermost tape guiding member including the attached detent member of FIG. 4.
Figure 8:
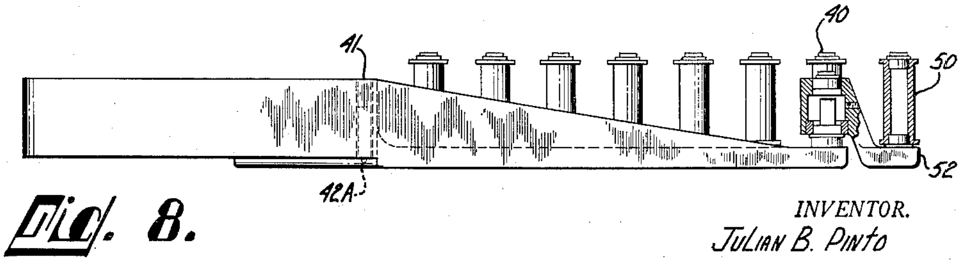
FIG. 8 is a side elevational view, partially in section, of the tape guiding member of FIG. 7.

The tape guiding member 32 is the topmost tape guiding member and will replace the tape supply reel. The tape guiding member 33 is the lower tape guiding member and is arranged in the same fashion as the member 32 except that it includes a tape tensioning device 44 and a pair of additional rollers 46 and 48 provided to return the continuous loop of tape back around the capstan 22. The two extra tape guiding rollers 46 and 48 are arranged as shown in FIG. 7. The tape guiding roller 46 is spaced inwardly and below the innermost tape guiding roller, while the roller 48 is arranged in substantial horizontal alignment with the roller 46 and spaced in vertical alignment with and below the roller corresponding to the roller 40. The tape tensioning device 44 is mounted on the outermost roller or roller 40 and carries an additional roller 50 mounted thereon for tape tensioning purposes. The roller 50 is mounted on a finger 52 and which finger is arranged to telescope over the roller 40 to be carried thereby. The outer portion of the finger 52 defines a platform in a parallel relationship plane of the arm 32ᵇ for mounting the roller 50 thereon in alignment with the remainder of the rollers 40. The finger 52 is internally spring biased and journalled at the telescoping portion to allow the finger 52 to be rotated about the roller 40 for changing the position of the roller 50 to provide a tape tensioning action.

The hand nuts 36 and 37 are of substantially cylindrical construction and are defined with one end being externally threaded and with the opposite end being flanged. The flanged end of the hand nuts 36 and 37 may be knurled to facilitate the gripping of the nut by hand.

With this structure in mind, it will be seen that the annular members 34 and 35 are secured to the tape transport base 10 adjacent the reel hubs 12 and 14 respectively. The tape guiding members 32 and 33 may then be placed over the annular members 34 and 35 at the respective land portions 34ᵇ and 35ᵇ. The tape guiding members 32 and 33 are located in the desired detent aperture 38 for the annular members 34 and 35 in accordance with the length of the loop to be transported. Then the hand nuts 36 and 37 may be threaded into the threaded portions of the annular ring members 34 and 35. When the hand nuts 36 and 37 are completely threaded into the members 34 and 35 the plungers 42ª will be held in the selected detent position. The horizontal position of the rollers 40 will be in alignment with the selected detent aperture 38. It should also be noted that the position of the tape guiding members 32 and 33 may be changed without removing the hand nuts 36 and 37 completely from the annular members 34 and 35. This change of position will result by simply unthreading these members to a point to allow the plunger 42ª to spring out of its detent aperture 38 and then rotating and securing the members 32 and 33 to the new position. This detent arrangement allows the members 32 and 33 to be moved in one-half inch increments without removing them from base 10. When both of these tape guiding members 32 and 33 are secured to the tape transport base in this fashion, the tape apparatus is prepared to receive the continuous loop of tape.

The continuous loop of magnetic tape is interlaced alternately around each of the tape guiding rollers 40 on the arms 32 and 33 in succession, as shown in FIG. 1. After the tape is looped around the innermost roller 40 for the arm 32, the tape is directed around the idler roller 18 and then around the reversing roller 28 back to the idler roller 30 and then returned to the member 33 by being looped around the extra rollers 46 and 48. The loop is completed by returning the tape from roller 48 to the outermost roller 40 for the member 32 by means of the tensioning roller 50. This roller 50 is rotated or adjusted to provide the correct amount of tension for transporting the tape. It will thus be seen that the continuous loop of magnetic tape will be driven through the transducing means 16 by the capstan 22 in the same fashion as was described hereinabove for the reel-to-reel operation.

The adjustment of the tape guiding members 32 and 33 is shown in FIG. 1 to accept the maximum length of tape. When it is desired to transport magnetic tapes of lengths different from the maximum length of tape for the tape apparatus, the guiding arms 32 and 33 are rotated in a counter-clockwise fashion, as described hereinabove. After the tape guiding arms 32 and 33 are once again secured in their new position, the magnetic tape will be interlaced around the tape guiding rollers 40 in the same fashion as described. In each instance the required number of rollers 40 for the members 32 and 33 are utilized in accordance with the length of tape.

The minimum length of tape loop that may be utilized requires the use of only one of the tape guiding members, in this instance the tape guiding member 33. This adjustment results upon placing the tape guiding arm 33 in its innermost position or rotated counter-clockwise from the maximum position, as shown in dotted outline in FIG. 1. In this position the guiding arm 33 is arranged adjacent the idler roller 30. The tape tensioning roller 50 is further adjusted so that it lies in a plane substantially parallel with the reversing roller 28. The continuous loop of tape is then interlaced around the reversing roller 28 and the tape tensioning roller 50 through the capstan 22. However, for this minimum length of tape it has been found that an auxiliary tape guiding adapter 55 is necessary. The tape guiding adapter 55 comprises a platform 57 adapted to be telescoped over the entering and exit rollers 20 and 29 respectively and which rollers are normally provided for the tape apparatus. The platform 57 is further provided with a pair of tape guiding rollers 59 and 60 mounted thereon in the usual fashion. The rollers 59 and 60 are spaced on the platform 57 relative to the rollers 20 and 29 at a point to change the angle of entry of the magnetic tape into the rollers 20 and 29. To this end the roller 59 is spaced upwardly from the roller 20 while the roller 60 is spaced downwardly from the roller 29; see FIG. 1. When the rollers 59 and 60 are arranged in this fashion, it has been found that the minimum loop of tape may be transported through the use of the single tape guiding member 33.

It will be appreciated by those skilled in the art that despite the fact that the tape transport has been shown and described in connection with magnetic tape apparatus, the concept of this invention may be utilized for transporting paper tape, film and the like. It will also be appreciated that the tape apparatus can be readily converted from continuous loop apparatus back to reel-to-reel operation as readily as the loop apparatus was attached. Even though the continuous loop apparatus has been shown detachable, it is conceivable such apparatus may be a permanent portion of the tape transport.

It will now be seen that a novel and improved tape apparatus has been provided by this invention and which apparatus may be readily operated as reel-to-reel or continuous loop apparatus with a minimum of effort, skill and time. The tape apparatus includes a minimum of parts for converting the tape machine from one type of operation to the other to thereby provide a more versatile and improved combination. The continuous loop is continuously variable to transport any length of tape between two and twenty feet in length.

What is claimed is:

1. Tape apparatus adapted for reel to reel or continuous loop operation comprising a tape transport base, means including tape reel hubs rotatably mounted on said base and adapted to receive reels for reel to reel operation, transducing means mounted on said base, tape guiding means mounted on said base, at least a single tape guiding arm including loop guiding means mountable and demountable on said base at said reel hubs, and means for clamping said arm to said base in a plurality of preselected positions whereby continuous loops of tape of different length may be interlaced from said loop guiding means on said arm and passed therefrom by means of said tape guiding means through said transducing means and back to said loop guiding means.

2. Tape apparatus adapted for reel to reel or continuous loop operation comprising a tape transport base, rotatable hubs mounted on said base and adapted to receive tape reels for reel to reel operation, transducing means mounted on said base, tape drive means mounted on said base adjacent said transducing means to drive tape therethrough, tape guide rollers mounted on said base and positioned thereon to guide the tape through said tape drive means, a pair of tape guiding arms including a plurality of tape guide rollers mounted on said arms attachable and detachable on said base around said reel hubs for receiving a continuous loop of tape and guiding same to said drive means whereby the loop is continuously driven between the rollers for each of said arms, and means for clamping said arms to said base including a plurality of spaced apart apertures, said arms further including a detent member cooperating with said apertures to position said arms at preselected positions.

3. Means for adapting tape apparatus from reel to reel operation to a continuous loop operation, said apparatus comprising a tape transport base, reel hubs extending outwardly from the tape transport base and adapted to receive tape reels, tape guiding means having an annular mounting portion and an elongated tape guiding arm extending therefrom, said annular mounting portion being positioned concentrically with respect to the reel hubs, said guiding arm including a plurality of tape guiding rollers aligned thereon to receive and guide the tape, an annular mounting member secured to the tape transport base and positioned concentrically to the associated reel hub, and a clamping member for clamping said tape guiding means to the transport base when the clamping member is secured to the mounting member.

4. A combination for use with tape apparatus having a tape transport base including transducing means, means for rotatably supporting a pair of removable tape reels, tape guiding means positioned on said base to guide tape to the transducing means for a transducing operation, a pair of tape guiding arms attachable to said transport base at said reel supporting means and arranged and constructed to receive a continuous loop of tape when attached to said transport base, said tape guiding means being disposed relative to said transducing means and said guiding arms to allow a continuous loop of message tape to be transported past said transducing means for a continuous loop transducing operation.

5. Means for adapting tape apparatus from reel to reel operation to a continuous loop operation, said apparatus comprising a tape transport base, reel hubs extending outwardly from the tape transport base and adapted to receive tape reels, tape guiding means having an annular mounting portion and an elongated tape guiding arm extending therefrom, said annular mounting portion being positioned concentrically with respect to the reel hubs, said guiding arm including a plurality of tape guiding rollers aligned thereon to receive and guide the tape, an annular mounting member secured to the tape transport base and positioned concentrically to the associated reel hub, said mounting member having an internally threaded portion, and a clamping member including an externally threaded portion for clamping said tape guiding means to the transport base when the clamping member is threaded into the internally threaded portions of the mounting member.

6. A combination for adapting tape apparatus from reel to reel operation to continuous loop operation, said combination including a tape transport base, reel hubs extending outwardly from the tape transport base, a pair of attachable and detachable tape guiding members having an annular mounting portion and an elongated tape guiding arm extending therefrom, said annular mounting portion threaded concentrically over one of the reel hubs in place of the associated reel and said guiding arm including a plurality of tape guiding rollers spaced and aligned thereon to receive and guide tape, and means for rotatably indexing and clamping each of said tape guiding members to said tape transport base to thereby allow continuous tape loops of different length to be transported by said tape guiding members.

7. Tape apparatus adaptable for reel to reel operation or continuous loop operation, including a tape transport base, a pair of reel hubs extending outwardly from the tape transport base and adapted to receive a removable reel thereon, transducing means spaced intermediate the reel hubs, tape guiding rollers spaced on said base to guide the tape through the transducing means, continuous loop tape guiding means having an annular mounting portion and an elongated tape guiding arm extending therefrom, said annular mounting portion fitting concentrically over one of the reel hubs to be mountable on the base to surround a reel hub in place of a detached reel and said guiding arm including a plurality of tape guiding rollers aligned and spaced thereon to receive and guide tape, annular mounting members for said tape guiding means attachable on said base in surrounding relationship with said reel hubs and having an internally threaded portion, said mounting members being further defined with a plurality of detent positions, said tape guiding means carrying a detent member for cooperation with the aforementioned detent positions, and externally threaded means adapted to be threaded into said threaded portion for said annular mounting members to clamp said tape guiding means to said mounting members in a preselected detent position.

8. Tape apparatus as defined in claim 7 wherein said continuous loop tape guiding means comprises a pair of substantially similar tape guiding members and wherein one of said members includes means for tensioning the continuous loop of tape and additional rollers for returning the loop of tape to the other member.

9. An attachment for converting tape apparatus from reel to reel operation to continuous loop operation wherein the tape apparatus includes a tape transporting base and a pair of tape reel hubs extending outwardly therefrom and adapted to receive reels that may be readily attached and detached therefrom and a transducing station comprising a mounting ring adapted to be mounted on the tape transport base concentrically with respect to a reel hub to encircle the hub in a spaced relationship and including an annular portion provided with a plurality of detent apertures and having an internally threaded portion, an adapter member having an annular mounting portion carrying a detent member adapted to overlie said mounting ring whereby the adapter may be selectively located by the engagement of said detent member in a detent aperture, said adapter member including a tape guiding arm extending from the mounting portion and carrying a plurality of spaced apart and aligned tape guiding rollers secured thereto, and a locking member having an internally threaded portion and defined to extend adjacent the mounting ring and the adapter member in spaced relationship with the reel hub whereby the interengagement of the threaded portions of the mounting ring and the locking member secure the adapter member to the tape transport base and the detent member in a preselected detent aperture.

10. An attachment for converting tape apparatus, as defined in claim 9, wherein the adapter member includes an additional roller supported in a cantilever relationship from one of the tape guide rollers adjacent to the free end of the tape guiding arm thereof and mounted to be swingable about said one guiding roller for providing tape tensioning.

References Cited in the file of this patent

UNITED STATES PATENTS

| | | |
|---|---|---|
| 1,299,792 | Serrurier | Apr. 8, 1919 |
| 2,637,560 | Smith | May 5, 1953 |

FOREIGN PATENTS

| | | |
|---|---|---|
| 936,428 | France | Feb. 16, 1948 |